(12) United States Patent
Margo et al.

(10) Patent No.: US 9,003,064 B2
(45) Date of Patent: Apr. 7, 2015

(54) MANAGEMENT OF B2B COMMUNITIES

(75) Inventors: Todd L. Margo, Flower Mound, TX (US); Dianne K. Blankenbaker, Columbus, OH (US); George Michael Middlebrook, Dublin, OH (US)

(73) Assignee: International Business Machines Corporation, Armonk, NY (US)

( * ) Notice: Subject to any disclaimer, the term of this patent is extended or adjusted under 35 U.S.C. 154(b) by 763 days.

(21) Appl. No.: 12/878,879

(22) Filed: Sep. 9, 2010

(65) Prior Publication Data

US 2012/0066388 A1    Mar. 15, 2012

(51) Int. Cl.
*G06F 15/16*    (2006.01)
*G06Q 10/06*    (2012.01)
*G06Q 30/06*    (2012.01)

(52) U.S. Cl.
CPC ............... *G06Q 10/06* (2013.01); *G06Q 30/06* (2013.01)

(58) Field of Classification Search
CPC ....... G06Q 10/06; G06Q 10/08; G06Q 30/06; G06Q 30/0605; G06Q 50/00; H04L 12/58; H04L 12/585; H04L 12/5855; H04L 51/12; H04L 51/14
See application file for complete search history.

(56) References Cited

U.S. PATENT DOCUMENTS

| | | | | |
|---|---|---|---|---|
| 7,051,072 | B2 * | 5/2006 | Stewart et al. | 709/204 |
| 8,046,441 | B2 * | 10/2011 | Banerji et al. | 709/220 |
| 2002/0174000 | A1 * | 11/2002 | Katz et al. | 705/7 |
| 2002/0188513 | A1 * | 12/2002 | Gil et al. | 705/22 |
| 2004/0078316 | A1 * | 4/2004 | Clark et al. | 705/37 |
| 2005/0198121 | A1 * | 9/2005 | Daniels et al. | 709/203 |
| 2007/0245002 | A1 * | 10/2007 | Nguyen et al. | 709/223 |
| 2008/0172344 | A1 * | 7/2008 | Eager et al. | 705/80 |
| 2009/0099879 | A1 * | 4/2009 | Ouimet | 705/7 |

\* cited by examiner

*Primary Examiner* — Patrice Winder
(74) *Attorney, Agent, or Firm* — Law Office of Jim Boice

(57) ABSTRACT

A method for managing a B2B electronic commerce community, wherein a plurality of B2B partners interact with a hub entity via a plurality of B2B applications, includes receiving interaction information describing interactions of a B2B partner with at least one of the B2B applications. The interaction information may describe a material flow, correspondence, transactions, notices, relationships, and so forth, between the B2B partner and the hub. Based at least in part on the received interaction information, the method develops a community manager that supports a common set of community management modules in communication with each of the B2B applications and maintains a single, hub-wide view of each of the B2B partners. The modules may include, as examples, modules for new partner on-boarding, community maintenance, improvement, and networking including social network tooling.

20 Claims, 4 Drawing Sheets

MANAGEMENT OF B2B COMMUNITIES

FIELD OF THE DISCLOSURE

The present disclosure relates to collaborative networks such as business-to-business (B2B) networks and, more particularly, to the management of such networks.

BACKGROUND

Large scale commercial entities engage in partnerships with suppliers, customers, and others. B2B networks and applications enable such entities to communicate and perform transactions with their partners electronically to support scalability, reliability, and reduce costs. Considerable effort is required, however, to implement and maintain B2B partnerships with a large number of partners.

DESCRIPTION OF THE EMBODIMENT(S)

Figure 1:
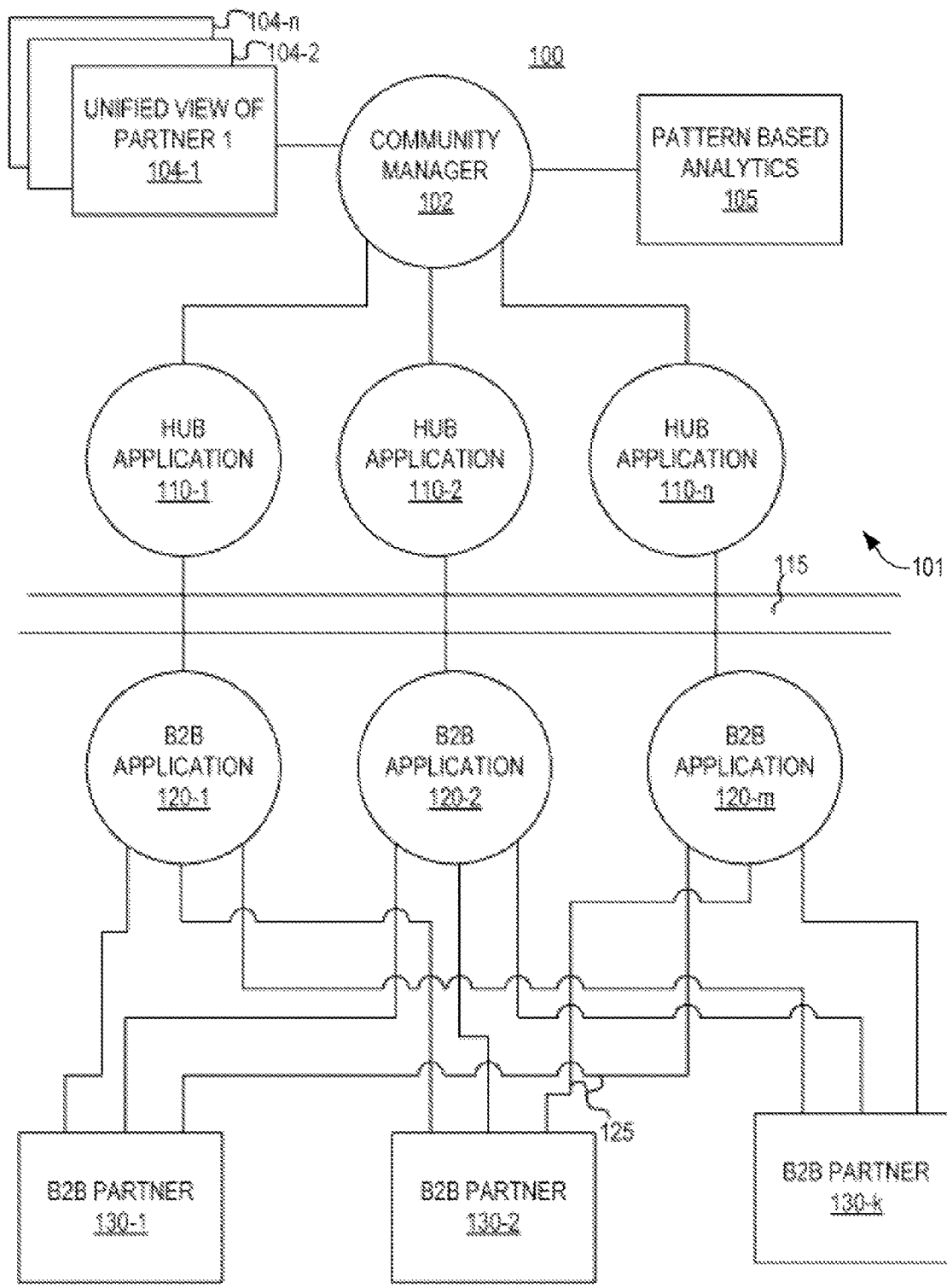
FIG. 1 is a block diagram of selected elements of an embodiment of a distributed or networked business to business community including a disclosed embodiment of a community management module.

A relatively recent development in Information Technology (IT) seeks to enable pattern-based strategy for business. Pattern-based strategy enables business leaders to actively seek, amplify, examine and exploit new business patterns. In order to support pattern-based strategy, organizations must determine in which activities they are investing and how these investments need to be adjusted to enable them to exploit new patterns within their own business as well as new patterns of signals coming from external sources that indicate a business opportunity or threat. See, e.g., *Pattern-Based Strategy Will Have Profound Impact on the Practice of EA* (*Enterprise Architecture*, Gartner Research 23 Sep. 2009).

Pattern-based strategy is emerging at the same time organizations are and will continue to be experiencing increasing complexity in their B2B collaboration networks. As used herein, a B2B collaboration network, also referred to herein as a B2B community, may be described as the collection of partner entities, including suppliers and customers, as well the information technology resources needed to support B2B communication, used by an entity, referred to herein as a hub, to create its supply and value chains for end-use products and services.

A hub might apply a pattern-based strategy to its B2B community to optimize supply chain and value chain processes. A hub that can identify and exploit new business patterns in their multi-enterprise B2B community and B2B processes might achieve a competitive advantage through excellence in supplier relationship management (SRM), customer relationship management (CRM), and partner relationship management (PRM).

Hub organizations may be unable to detect business level patterns timely and efficiently unless they implement a unified and comprehensive approach to business collaboration network management. Historically, however, B2B communities and the management of B2B communities has evolved in piecemeal fashion, with limited technology application, an excess of archaic paper-based manual processes, and correspondingly excessive cost. When relationship management technology is employed to B2B communities, it has historically been embedded in site-deployed applications including enterprise resource (ERP) applications, CRM applications, B2B gateway software, software-as-a-service (SaaS)-based B2B applications, and traditional electronic data interchange (EDI) value added applications. These efforts may be characterized as providing partial solutions, having limited scope, and failing to view community management as a business process management discipline in its own right. For example, providers of EDI value added applications are typically focused on recruiting and "on-boarding" partners for EDI transactions. (As used herein, the term "on-boarding" refers to the process of establishing a functional electronic relationship between a hub and a B2B partner). These same providers, however, typically do not address other aspects of a B2B partnership including maintenance of the partnership after initial implementation or improving the partnerships through, as examples, performance measurement and evaluation.

In addition, the diversity and rapid evolution of technology impacting electronic commerce may fracture a B2B implementation resulting, for example, in a situation where one division within a hub views its relationship with a trading partner from a first perspective using a first set of applications executing on a first platform while another division within the hub may view its partnership with the same trading partner from an entirely different perspective. In one aspect, disclosed implementations of electronic B2B community management resources may implement or support a single-view-of-community objective in which all divisions within a hub interact with a common representation of the B2B community and the partners within that community.

Managing partnerships within a B2B community may be described as a comprehensive discipline in which business process management (BPM) technology may be comprehensively applied to reduce operational costs and improve process efficiencies. Disclosed embodiments of a framework for comprehensive B2B community enablement and maintenance address these objectives. The framework may be characterized as a support structure for achieving excellence in the more specific disciplines of SRM, CRM, and PRM. Although disclosed embodiments emphasize IT and BPM technology for large entities, other implementations may be suitable for use in media or small business environments.

Large organizations must rely on networks of customers, 3rd party intermediaries (partners) and suppliers. For effective and efficient supply chains, these networks of external entities must be managed and optimized. Historically, however, organizations have pursued B2B community management in piecemeal fashion with implementation specific and application code and work flows. Such B2B community management efforts frequently lack visibility into associated community management processes. Even if a hub could detect patterns in its B2B community, the hub may lack the ability to effectively act on a detected pattern in a coordinated fashion, since action mechanisms, where they exist at all, are embedded in proprietary and domain-specific business applications. Real-world processes, such as retailer charge-backs, are typically supported with a combination of basic IT (such as EDI documents), manual practices including phone calls, and supplemental paper work. Essentially, then, organizations implement sub-optimal BPM for their business collaboration networks, leading to excessive costs, weaker collaborative business relationships, and an inability to recognize and seize certain kinds of opportunities.

Disclosed herein are embodiments of a comprehensive BPM overlay framework that supports a set of core community management practices, broadly applicable for an organization. Disclosed embodiments of the framework provide integrated visibility and action mechanisms to support pattern-based strategies for optimizing B2B communities. Disclosed embodiments employ a multi-faceted process model for B2B community management that addresses establishing an electronic relationship that enables communication and other activity between B2B partners and maintaining the B2B partnership including the discovery of a potential new external entity.

Establishing an electronic relationship encompasses provisioning process management for electronic B2B partnerships. Regardless of the type or style of a partnership, a B2B partnership involves data exchange across firewalls and data integration with back-end systems to achieve a mutually beneficial process outcome or to synchronize business data and event visibility. Provisioning processes for electronic B2B partnerships, which can be highly technical and case-oriented, may include configuration data gathering and exchange, integration of configuration data into operational systems, testing and certification for electronic communications and data integration, and migration from a test environment to a production environment.

Processes for maintaining an established electronic relationship processes emphasize correcting configuration problems when they occur and pro-active mechanisms for managing external entity master data management, such as periodic contact information update requests. Embodiments of the disclosed framework encompass mechanisms for problem detection, notifications, configuration data synchronization, and case management workflow for problem resolution.

Maintenance may further encompass detecting and resolving non-configuration-related operational problems, such as a data value error in an EDI document. Disclosed embodiments of the framework encompass enterprise application integration (EAI) mechanisms to process events published by operational systems (such as B2B Gateway software) involved in executing multi-enterprise transactions. These events can indicate exceptions in the delivery of business content, content metadata, or a content problem. Disclosed embodiments of the B2B community management framework detect these exceptions and provide a collaborative resolution structure.

Embodiments of the disclosed framework provide visibility of and process management support for monitoring service level agreements, implementing and managing performance scorecards, and other performance management analysis capabilities to help organizations achieving particular goals with respect to particular business collaboration networks. Embodiments may include an embedded Business Rules Engine (BRE) to specify service level agreements and help detect anomalies. Embodiments may also include an embedded statistical calculations engine and data repository to support scorecard construction and analysis. Implementation of the framework may provide a web portal for external entities, to enable self-service assessment of performance.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Disclosed embodiments may incorporate modern system oriented architecture (SOA) and BPM technology. These embodiments may enable or support comprehensive process automation as well as complex case management oriented human-centric workflows to improve, for example, efficiencies of service provisioning processes. Process models may be defined using a standardized BPM language, e.g., BPEL (Business Process Execution Language), and leverage proprietary extensions for case management applications requiring complex human workflow management.

Case management as implemented in disclosed embodiments of the framework may encompass multiple applications. Case management enables collaborative, managed, and efficient outcomes. It may be used in provisioning of new external entities, provisioning of new services for existing entities, and for collaborative resolution of operational problems. Embodiments of the framework may manage cases as semi-structured, goal-directed, long-lived business processes, whose basic (coarse-grained) states include: new, open, working, and closed. The framework may enable custom definition of case workflows, including the ability to support fine-grained states.

Embodiments may provide template processes for each supported process as well as a mechanism for customizing out-of-the-box process models. Embodiments may also leverage an event framework and repository that enables visibility of business collaboration network events across a range of related processes. Some embodiments may include an embedded complex event processing engine that enables the detection of composite events for pattern creation, recognition, and refinement to support pattern-based strategy.

The framework as disclosed may manage and secure access to unstructured documents, such as copies of legal documents associated with an external entity relationship. The framework may also include a data gathering subsystem that enables a hub organization to collect provisioning information from external entities. Some embodiments may employ an XML-based API that enables integration with external operational systems. Questionnaires may be used to gather highly technical information (such as the location of an FTP server) as well as business level or back-end application integration information.

In some embodiments, a centralized database for partner profile information and other relevant metadata and artifacts is employed. The framework may be configured to synchronize relevant B2B master data with external operational systems such as B2B Gateway systems. Some implementations encompass a secure web portal environment that provides a self-service vehicle for external entities that interact with a hub. Embodiments of the framework may support customized workflows for service provisioning and partner management for vertical industry applications.

In one aspect, a method for managing a B2B electronic commerce community, in which a plurality of B2B partner entities interact with a hub entity via a plurality of B2B applications, is disclosed. Embodiments of the disclosed method include receiving interaction information that describes or is otherwise indicative of communications or interactions of a B2B partner with one or more of the B2B applications. The interaction information may be indicative of a material flow transaction, correspondence or other form of communication, notices, and relationships between the B2B partner and the hub. The method may further include developing, based at least in part on the received interaction information, a community manager that supports a common set of community management modules in communication with each of the B2B applications. The method may still further include implementing the common set of models to facilitate, with respect to each applicable B2B application, various community management processes and objectives including, as example, on-boarding of new B2B partners, establishing a single view of each of the B2B partners, and automated maintenance of B2B partnerships.

In some embodiments, the method may further include maintaining the interaction information in a database where the interaction information is associated with the applicable single view of the B2B partner. In these embodiments, the method may still further include enabling each of the various B2B applications to access the interaction information via the single view of the B2B partner.

In some implementations, a first B2B application communicates with a first hub application and generates first interaction information while a second B2B application communicates with a second hub application to generate second interaction information. For example, the first B2B application may be an EDI application that communicates with a hub's ERP system, possibly through an intervening system such as an integration suite, while the second B2B application may be a CRM application that communicates with a different hub application.

The community manager may include an on-boarding module that implements policies to facilitate the establishment of an electronic relationship with a new B2B partner. The on-boarding module may include or support policies to enable potential partners to employ self service to establish an electronic relationship with the hub. The on-boarding module may also implement policies that enable a new B2B partner to test the operation of one or more types of transactions before the B2B partner attempts to perform an actual transaction.

The community manager may further include a maintenance module supporting procedures for maintaining an electronic relationship between the B2B partner and the hub. The management module may be configured, as examples, to monitor transactions between the B2B partner and the hub, establish criteria for generating transaction alerts, generate alerts pursuant to the established criteria, and resolve any contention between the B2B partner and the hub arising from a transaction. The maintenance module may be configured, as an example, to track transactions with a B2B partner for compliance with a service level agreement between the B2B partner and the hub.

The community manager still further include a partnership improvement module that implements policies measure, track, or otherwise gather statistics associated with transactions between a B2B partner and the hub. The partnership improvement module may still further analyze the transaction statistics, and, when the transaction statistics indicate an area of concern, modifying aspects of the partner management module to address the area of concern.

The community manager may still further include a community improvement module configured to implement policies to identify potential B2B partners and collaborate with existing B2B partners through electronic dialogue. The community improvement module may incorporate social network modules that incorporate social networking elements, such as contact linking, and partnership-specific announcements, forums, blogs, bulletin boards, and so forth to facilitate communication within the community. The community improvement module might, as an example, support any one or more of these tools to implement transaction reconciliation, collaborative dispute resolution, and the like.

Some embodiments may be implemented in software configured to execute or perform disclosed methods. These embodiments may be implemented as a set of processor executable instructions stored on or embedded in a computer readable storage or memory medium. Still other embodiments may be implemented in an apparatus, such as a server or other form of computer, computing system, or data processing system that includes a processor having access to a computer readable medium configured as described.

Turning now to the drawings, FIG. 1 depicts selected elements of an embodiment of an electronic B2B network 100, also referred to herein as B2B community 100. B2B community 100 as depicted in FIG. 1 represents the B2B implementation of a hub entity, referred to herein simply as hub 101. The embodiment of hub 101 depicted in FIG. 1 includes a set of hub-deployed applications 110-1 through 110-$n$, a community manager 102, and a set of data structures referred to as partner view data structures 104-1 through 104-$k$. Hub applications 110 represent various enterprise applications employed by hub 101. Hub applications 110 may include, as examples, enterprise resource planning (ERP) applications, customer relationship management (CRM) applications, supply chain management (SCM) applications including EDI applications, database management applications, as well as other applications designed to facilitate the operations of hub 101.

While each hub application 110 may perform, to various degrees, one or more aspects of community management, hub applications 110 may be characterized as dedicated function applications that may or may not share command languages and database formats with other hub applications 110. Development of a community manager solution applicable to hub application 110-1 may not, for example, contribute to the development or improvement of a second hub application 110-2. To address community manager issues that arise from the uniqueness of each hub application 110, hub 101 as depicted in FIG. 1 employs community manager 102 in communication with each of the hub applications 110.

Community manager 102 is configured to implement a consistent set of community manager policies across the set of hub applications 110. Community manager 102 may monitor and store or otherwise log transactions that occur between hub 101 and its B2B partners 130. Community manager 102 may be further configured to analyze or otherwise process transaction information to identify community manager characteristics of the hub applications 110 and to enable the hub applications 110 to employ or support a uniform set of community manager policies across the set of hub applications 110. As an example, community manager 102 may enable each hub application 110 to support self-service establishment of a B2B presence within the B2B resource of hub 101. Similarly, community manager 102 may include policies that enable hub applications 110 to implement a "sandbox" or test area where a new B2B partner can test and debug a transaction before "going live."

The depicted elements of FIG. 1 still further include a network 115 disposed between hub 101 and a plurality of B2B partners. Network 115 may include aspects of public networks such as the Internet as well as private networks such as corporate intra-nets. Network 115 may include firewalls, gateways, routers, and/or other forms of network hardware or software. Network 115 may also encompass various physical media including broadband media such as optical fiber, coaxial cable, twisted pair copper media, and so forth.

B2B applications 120 as depicted in FIG. 1 enable B2B partners 130 to communicate with hub 101 via the hub applications 110 depicted in FIG. 1. A B2B application 120 may include or employ a configuration that is specific or customized to the relationship between B2B partners 130 that invoke a B2B application.

As depicted in FIG. 1, community manager 102 maintains a set of data structures referred to herein as unified view data structures 104. Each unified view data structure 104 is a representation of a B2B partner 130. In some embodiments, a single unified view data structure 104 is maintained for each B2B partner. A unified view data structure 104 is generated based on interactions between hub 100 and a B2B partner 130. In some embodiments, all interactions, represented in FIG. 1 by reference numeral 125, with a B2B partner 130 are incorporated into the unified view 104 such that all divisions (not shown expressly) within hub 101 access a common view of a B2B partner 130.

Figure 2:
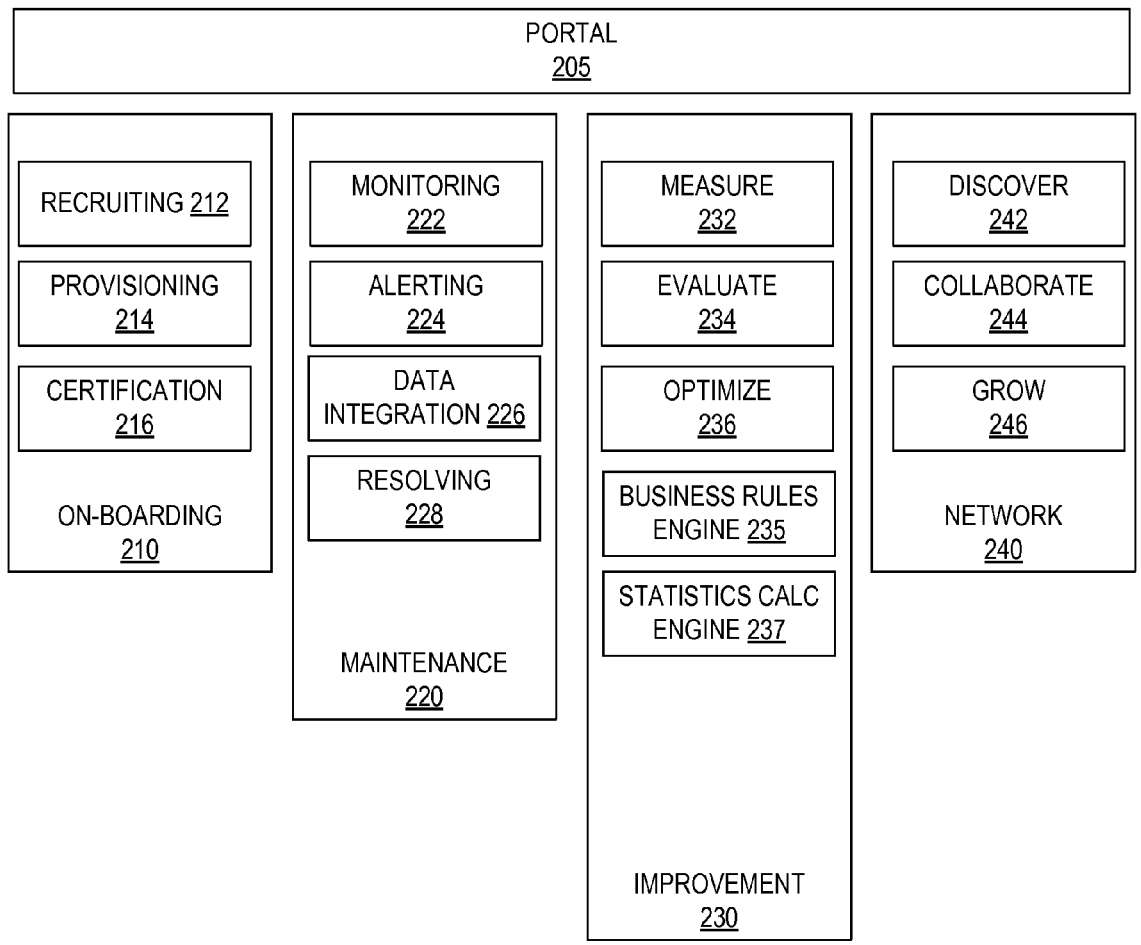
FIG. 2 is a block diagram of selected elements of the embodiment of the community management module depicted in FIG. 1.

Turning now to FIG. 2, selected elements of an embodiment of the community manager 102 depicted in FIG. 1 are illustrated. In the depicted embodiment, community manager 102 includes an on-boarding module 210, a maintenance module 220, an improvement module 230, a network module 240, and a partner web portal 205 that may be accessible to each of the modules 210-240. Other embodiments may include more or fewer modules. Each of the modules 210, 220, 230 and 240 emphasize a corresponding aspect of a community manager addressed by community manager 102.

On-boarding module 210 is directed at processes for facilitating the establishment of a new B2B partnership including the establishment of an electronic relationship between the new B2B partner and hub 101. For purposes of this disclosure an electronic relationship refers to the mechanisms, procedures, and protocols by which B2B partners engage in electronic transactions and other forms of electronic communication. Large entities expend significant resources just establishing and managing electronic relationships with their B2B partners. On-boarding module 210 provides a framework for improving or optimizing the on-boarding process that hub 101 engages in with new B2B partners. In the depicted embodiment, on-boarding module 210 implements or supports modules for recruiting (212), provisioning (214), and certifying (216) electronic relationships with new B2B partners.

Recruiting module 212 may encompass processes involved with the initial researching and discovery of a potential new external entity, the approval decision to initiate a new relationship process, and the initial effort to recruit the entity, including establishing a basic legal agreement for a relationship. Provisioning module 214 implements management provisioning processes for B2B partnerships. B2B partnerships may be characterized as conforming to one of a set of partnership styles. The type of style influences the nature of a provisioning process. See, e.g., Benoit J. Lheureux, *The Four Styles of Process Execution in Multienterprise Scenarios*, (Gartner, Inc. 14 Aug. 2008). The B2B partnership styles include Blind Document/Transaction Exchange, Intelligent Document Exchange, Multi-enterprise Applications (with hard-coded application functionality), and Multi-enterprise Application (leveraging a flexible Business Process Management (BPM) engine). Each style involves data exchange across firewalls (shared data and process) and data integration with back-end systems (private data and process), to achieve a mutually beneficial process outcome or to synchronize business data and event visibility. Provisioning module 214 may include processes for configuration data gathering and exchange and integration of configuration data into operational systems. Certification module 216 may include modules for testing and certifying electronic communications and data integration as well as migration from a test-to-production environment.

Maintenance module 220 may include modules for correcting configuration problems when they occur and modules for managing external entity master data management, such as periodic contact information update requests. In the depicted embodiment, maintenance module 220 includes a monitoring/detecting module 222, a notification/alert module 224 to provide notifications of problems, an integration module 226 for configuration data synchronization, and a resolution module 228 to provide case management workflows for problem resolution. Maintenance module 220 may further include functionality for identifying and troubleshooting operational problems that are not attributable to configuration issues, e.g., a data value error in an EDI document. Embodiments of maintenance module 220 may provide enterprise application integration (EAI) mechanisms to consume events published by operational systems (such as B2B Gateway software) involved in executing multi-enterprise scenarios. These events can indicate exceptions in the delivery of business content, content metadata, or a content problem. Maintenance module 220 may be configured to detect exceptions from external systems and provide a structure to collaboratively resolve the exceptions.

In some embodiments, improvement module 230 provides visibility and process management support for monitoring service level agreements, implementing and managing performance scorecards, and other performance management analysis capabilities to help organizations achieving particular goals with respect to particular business collaboration networks. In some embodiments, improvement module 230 employs an embedded business rules engine 235 to specify service level agreements and help detect anomalies. Improvement module 230 may also include an embedded statistical calculations engine 237 and data repository (not depicted), to support scorecard construction and analysis. As depicted in FIG. 2, improvement module 230 may enable the hub's B2B partners to access a self-service assessment of performance via partner web portal 205.

Network module 240 may include various types social network tooling to enhance and sustain B2B partnerships. Network module 240 may include a collaborative dispute resolution module for processes like transaction reconciliation (module 242) (such as resolving unsupported chargebacks). Network module 240 may further incorporate other Web 2.0 social network aspects such as forums and announcements 244, and blogs 246.

Figure 3:
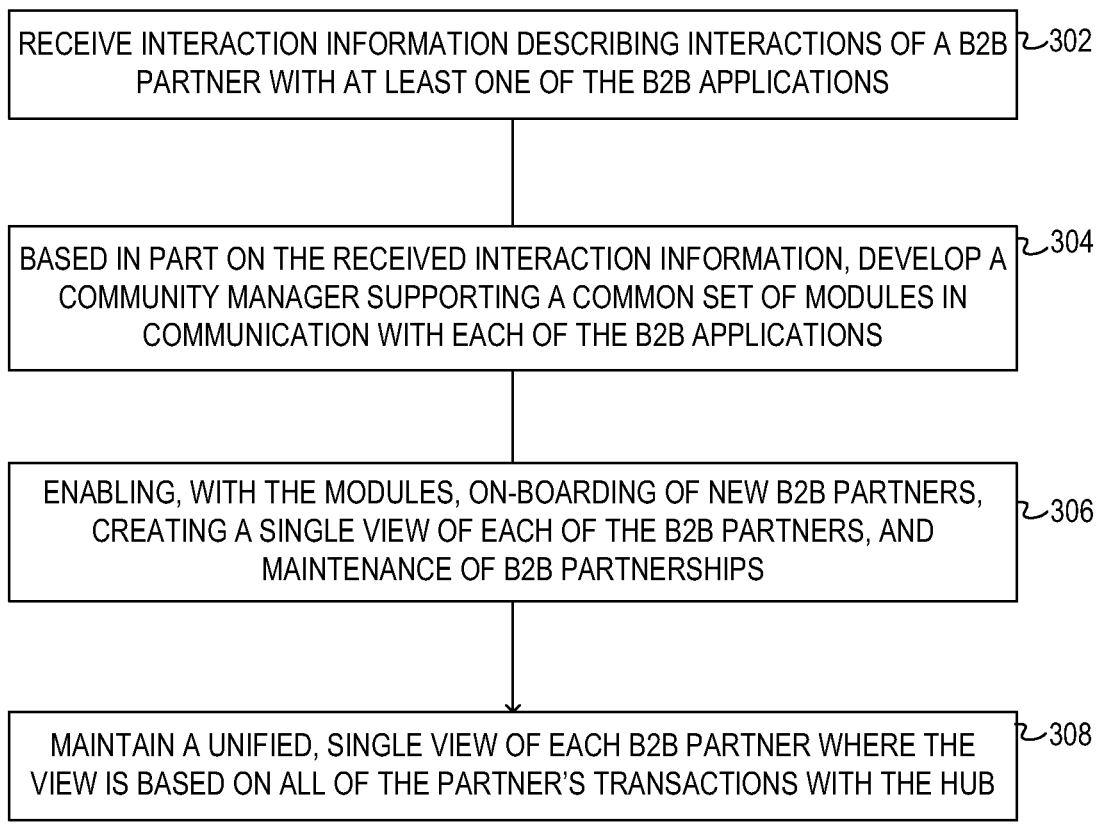
FIG. 3 is a flow diagram of selected elements of a method for managing a community of trading partners.

Referring now to FIG. 3, selected elements of an embodiment of a B2B community management method 300 are depicted. Although method 300 represents a method or process, i.e., a sequence of actions, method 300 may be embodied as a set of computer-executable or processor-executable instructions, stored or otherwise embedded in a computer readable storage or memory medium, that, when executed by the processor or computer, cause the processor or computer to perform the described actions.

In the depicted embodiment, method 300 encompasses a method for managing a B2B community, in which a plurality of B2B partners interact with a hub via a plurality of B2B applications. As depicted in FIG. 3, method 300 includes receiving (302) interaction information describing or otherwise indicative of interactions between B2B partner and the hub via at least one of the B2B applications. The interaction information may describe or indicate, as examples, a flow of materials or goods between the parties, correspondence between the parties, electronic transactions, notices, or even relationships between the parties.

Method 300 may further include developing (block 304) a community manager, based at least in part on the interaction information received in block 302. The community manager may implement or support a common set of community manager modules in communication with each of the B2B applications. The community manager modules may include any of the modules discussed above with respect to FIG. 2 in addition to other modules.

The embodiment of method 300 depicted in FIG. 3 still further includes implementing (block 306) the common set of modules to achieve a variety of community manager objectives with respect to each applicable B2B application and B2B partner. The community manager objectives may include, as examples, on-boarding of new B2B partners, establishing a single view of each of the B2B partners, automated maintenance of B2B partnerships, and establishing a partner portal that supports various self service activities that the partner may perform unassisted by the hub. The self service portal may support self service establishment of an electronic relationship with the hub, perhaps including self service validation checks on electronic and non structured documents including legal documents.

Method 300 as depicted in FIG. 3 still further includes processing (block 308) the interaction information to achieve and maintain a single, hub-wide view of each B2B partner. The single view is made accessible to each division within the hub such that all divisions access a common description of the partner.

Figure 4:
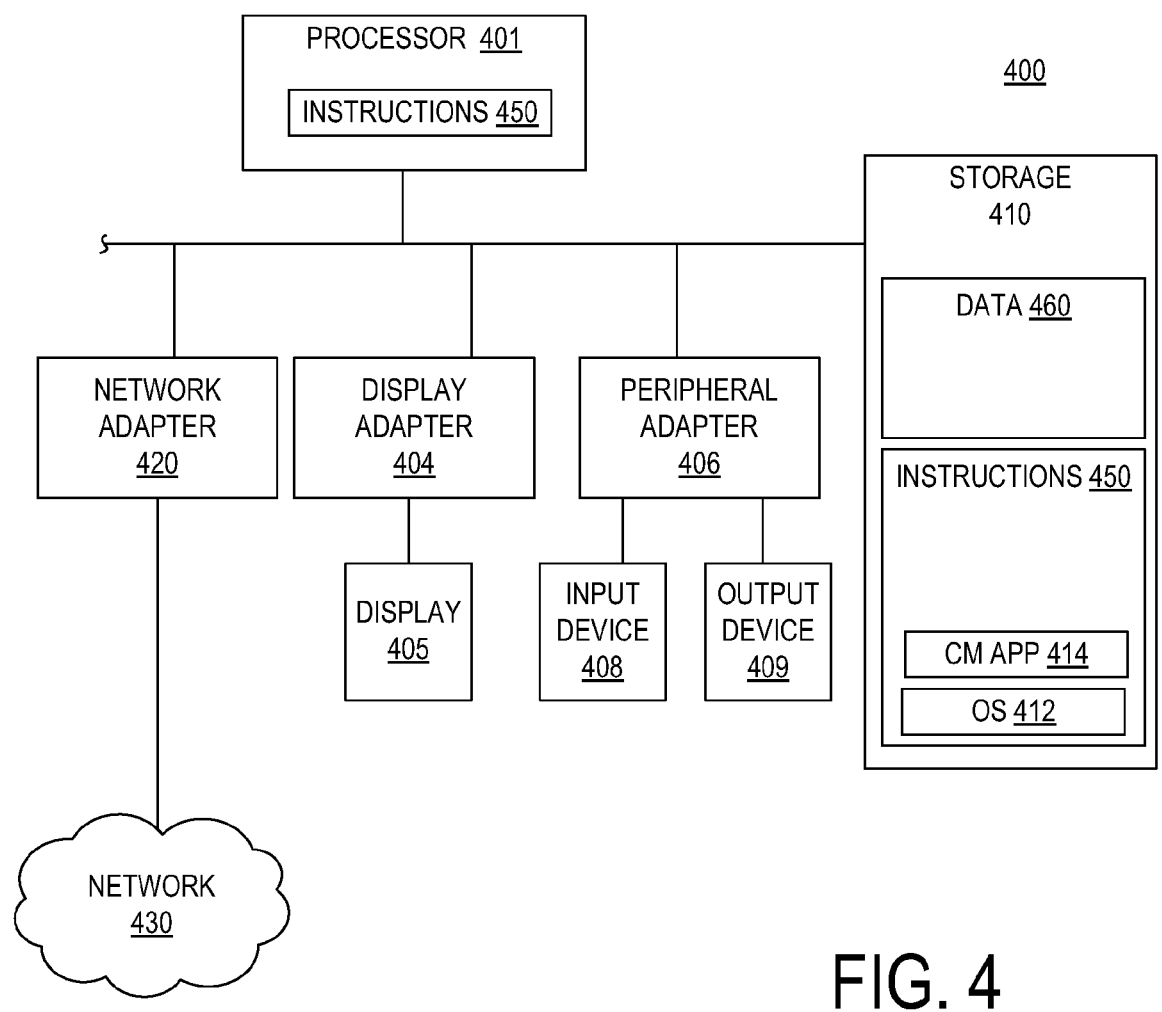
FIG. 4 is a block diagram of selected elements of an embodiment of a computing device.

Referring now to FIG. 4, a block diagram illustrating selected elements of an embodiment of a data processing or computing apparatus 400 for managing a collaborative network community such as a B2B community of a commercial entity as discussed previously is presented. Computing apparatus 400 may be implemented as a server system, a desktop or laptop computer, a network appliance, and so forth. Moreover, elements of computing apparatus 400 may be distributed across two or more physical systems. As an example, storage elements of computer apparatus 400 may be implemented on different physical system(s) than instruction executing or processing elements.

In the embodiment depicted in FIG. 4, computing apparatus 400 includes a processor 401 coupled to and having access to storage media 410. Computing apparatus 400, as depicted in FIG. 4, further includes network adapter 420 that interfaces computing apparatus 400 to a network 430. Depending upon the implementation, network 430 encompasses local area networks, an entity's intranet or other form of private network, as well as public networks including the Internet.

Computing apparatus 400, as depicted in FIG. 4, includes a peripheral adapter 406 configured to provide connectivity between processor 401 and input device 408 and output device 409. Input device 408 may represent a device for user input, such as a keyboard or a mouse, or even a video camera. Output device 409 may represent a device for providing signals or indications to a user, such as loudspeakers for generating audio signals.

Apparatus 400 as shown in FIG. 4 includes a display adapter 404 and a display device or, more simply, a display 405. Display adapter 404 may provide an interface between processor 401 and display 405. Display 405 may comply with any of various display standards for computer monitors and/or television displays.

Storage media 410 encompasses persistent and volatile media, fixed and removable media, magnetic, semiconductor, and optical media. As depicted in FIG. 4, storage media 410 stores data 460 and instructions 450, which may represent one or more sets of instructions embodying or utilized by any one or more of the methods and/or operations described herein. In the depicted example, instructions 450 include an operating system 412 and a community manager application 414, which may implement any of the methods, policies, and practices described above. As depicted in FIG. 4, instructions 450 may also reside, completely or at least partially, within processor 401 during execution thereof by computer apparatus 400.

To the maximum extent allowed by law, the scope of the present disclosure is to be determined by the broadest permissible interpretation of the following claims and their equivalents, and shall not be restricted or limited to the specific embodiments described in the foregoing detailed description.

What is claimed is:

1. A non-transitory computer readable medium including stored, processor executable instructions that, when executed by a processor, cause the processor to perform operations comprising:
   receiving interaction information describing communications of a business-to-business (B2B) partner including first partner communications with a first B2B application and second partner communications with a second B2B application, wherein the first B2B application interacts with a first hub application and the second B2B application interacts with a second hub application, different than the first hub application, wherein the interaction information describes at least one of: material flow, correspondence, transactions, notices, and relationships between the B2B partner and the hub;
   processing the interaction information to generate a single unified view of the B2B, wherein the first hub application and the second hub application both access the single unified view of the B2B partner;
   based in part on the received interaction information, developing a community manager, the community manager supporting a common set of modules in communication with each of the B2B applications; and
   implementing the common set of modules to facilitate, with respect to each applicable B2B application, on-boarding of new B2B partners, establishing a single unified view of each of the B2B partners, and automated maintenance of B2B partnerships.

2. The computer readable medium of claim 1, wherein each of the plurality of B2B applications accesses the interaction information via the single unified view of the B2B partner.

3. The computer readable medium of claim 1, wherein the first hub application comprises a supply chain management application and the second hub application comprises either a customer relationship management application or an enterprise resource planning application.

4. The computer readable medium of claim 3, wherein the first B2B application is an application for facilitating electronic data interchange (EDI) transactions between the hub and the B2B partner.

5. The computer readable medium of claim 1, wherein the community manager includes an on-boarding module implementing policies to facilitate the establishment of an electronic relationship with a new B2B partner.

6. The computer readable medium of claim 5, wherein the on-boarding module implements policies to provide self-service establishment of an electronic relationship by the new B2B partner.

7. The computer readable medium of claim 5, wherein the on-boarding module implements policies to enable a B2B partner to test operation of a transaction.

8. The computer readable medium of claim 1, wherein the community manager includes a maintenance module implementing procedures for maintaining an electronic relationship between the B2B partner and the hub, wherein the maintenance module is configured to monitor transactions between the B2B partner and the hub, establish criteria for generating transaction alerts, generate alerts pursuant to the established criteria, and resolve any contention between the B2B partner and the hub arising from a transaction.

9. The computer readable medium of claim 8, wherein the maintenance module is configured to track transactions with the B2B partner for compliance with a service level agreement between the B2B partner and the hub.

10. The computer readable medium of claim 8, wherein the community manager includes a partnership improvement module to measure statistics associated with transactions between the B2B partner and the hub, analyze the transaction statistics, and, responsive to the transaction statistics suggesting an area of concern, modify aspects of the maintenance module to address the area of concern.

11. The computer readable medium of claim 1, wherein the community manager includes a community improvement module configured to implement policies to identify potential B2B partners and collaborate with existing B2B partners through electronic dialogue.

12. In a business-to-business (B2B) electronic commerce community, wherein a plurality of B2B partners interact with a hub via a plurality of B2B applications, a method of managing the community, the method comprising:
  receiving interaction information describing communications of a B2B partner including first partner communications with a first B2B application and second partner communications with a second B2B application, wherein the first B2B application interacts with a first hub application and the second B2B application interacts with a second hub application, different than the first hub application, wherein the interaction information describes at least one of: material flow, correspondence, transactions, notices, and relationships between the B2B partner and the hub;
  processing the interaction information to generate a single unified view of the B2B partner, wherein the first hub application and the second hub application both access the single unified view of the B2B partner;
  based in part on the received interaction information, developing a community manager, the community manager supporting a common set of modules in communication with each of the B2B applications; and
  implementing the common set of modules to facilitate, with respect to each applicable B2B application, on-boarding of new B2B partners, establishing a single unified view of each of the B2B partners, and automated maintenance of B2B partnerships.

13. The method of claim 12, wherein the interaction information includes first interaction information indicative of the B2B partner invoking the first B2B application and second interaction information indicative of the B2B partner invoking the second B2B application and wherein the first B2B application is an application for facilitating electronic data interchange (EDI) transactions between the hub and the B2B partner.

14. The method of claim 12, further comprising developing a community manager, including a common set of B2B community management modules, in communication with each of the B2B applications, wherein the community manager includes an on-boarding module implementing policies to facilitate the establishment of an electronic relationship with a new B2B partner.

15. The method of claim 14, wherein the community manager further includes a maintenance module for:
  monitoring transactions between the B2B partner and the hub;
  establishing criteria for generating transaction alerts;
  generating alerts pursuant to the established criteria;
  resolving any contention between the B2B partner and the hub arising from a transaction; and
  tracking transactions with the B2B partner for compliance with a service level agreement between the B2B partner and the hub.

16. The method of claim 15, wherein the community manager further includes a partnership improvement module, wherein the improvement module to measure statistics associated with transactions between the B2B partner and the hub, analyze the transaction statistics, and, responsive to the transaction statistics suggesting an area of concern, modifying aspects of the maintenance module to address the area of concern.

17. The method of claim 14, wherein the community manager includes a community improvement module configured to implement policies to identify potential B2B partners and collaborate with existing B2B partners through electronic dialogue.

18. The method of claim 17, wherein the community improvement module includes a social network module configured to enable at least one of: contact linking, forums, blogs, and bulletin boards.

19. A data processing apparatus, comprising a processor, a non-transitory computer readable storage medium accessible to the processor, the computer readable storage medium including stored, processor executable instructions that, when executed by a processor, cause the processor to perform operations comprising:
  receiving interaction information describing communications of a business-to-business (B2B) partner including first partner communications with a first B2B application and second partner communications with a second B2B application, wherein the first B2B application interacts with a first hub application and the second B2B application interacts with a second hub application, different than the first hub application, wherein the interaction information describes at least one of: material flow, correspondence, transactions, notices, and relationships between the B2B partner and the hub;
  processing the interaction information to generate a single unified view of the B2B partner, wherein the first hub application and the second hub application both access the single unified view of the B2B partner;
  based in part on the received interaction information, developing a community manager, the community manager supporting a common set of modules in communication with each of the B2B applications; and
  implementing the common set of modules to facilitate, with respect to each applicable B2B application, on-boarding of new B2B partners, establishing a single unified view of each of the B2B partners, and automated maintenance of B2B partnerships.

20. The apparatus of claim 19, wherein the community manager includes:
  an on-boarding module implementing policies to facilitate the establishment of an electronic relationship with a new B2B partner;
  a maintenance module for maintaining an electronic relationship between each B2B partner and the hub, wherein the maintenance module is configured to monitor transactions between B2B partners and the hub, establish criteria for generating transaction alerts, generating alerts pursuant to the established criteria, and resolving contention between the B2B partners and the hub arising from the transaction;
  a partnership improvement module to measure statistics associated with transactions between the B2B partner and the hub, analyze the transaction statistics, and, responsive to the transaction statistics suggesting an area of concern, modifying aspects of the maintenance module to address the area of concern; and a community improvement module to identify potential B2B partners and collaborate with existing B2B partners through electronic dialogue, the electronic dialogue including a social network module configured to enable at least one of: contact linking, forums, blogs, and bulletin boards.

* * * * *